United States Patent
Chin et al.

(10) Patent No.: US 8,977,261 B2
(45) Date of Patent: Mar. 10, 2015

(54) HARDWARE ACTIVATION OF DUAL USIM MULTIMODE MOBILE TERMINAL

(75) Inventors: Tom Chin, San Diego, CA (US);
Guangming Shi, San Diego, CA (US);
Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/087,248

(22) Filed: Apr. 14, 2011

(65) Prior Publication Data
US 2012/0040670 A1    Feb. 16, 2012

Related U.S. Application Data

(60) Provisional application No. 61/372,776, filed on Aug. 11, 2010.

(51) Int. Cl.
| | |
|---|---|
| *H04W 4/00* | (2009.01) |
| *H04M 1/00* | (2006.01) |
| *H04B 1/38* | (2006.01) |
| *H04W 88/06* | (2009.01) |
| *H04W 60/00* | (2009.01) |

(52) U.S. Cl.
CPC ............ *H04W 88/06* (2013.01); *H04W 60/005* (2013.01); *Y02B 60/50* (2013.01)
USPC ...................... 455/435.1; 455/551; 455/552.1; 455/574

(58) Field of Classification Search
CPC . H04W 36/00; H04W 36/0022; H04W 36/14; H04W 36/16; H04W 36/24; H04W 36/34; H04W 52/02; H04W 52/0209; H04W 52/0274; H04W 60/00; H04W 60/005; H04W 84/12; H04W 88/06; Y02B 60/50

USPC .......... 455/435.1–449, 458, 551–553.1, 574, 455/127.5; 370/331, 338
See application file for complete search history.

(56) References Cited

U.S. PATENT DOCUMENTS

| | | | |
|---|---|---|---|
| 2004/0205158 A1* | 10/2004 | Hsu ............................... 709/218 |
| 2005/0048972 A1* | 3/2005 | Dorenbosch et al. ......... 455/436 |
| 2006/0205444 A1* | 9/2006 | Aerrabotu et al. ............ 455/574 |
| 2007/0140157 A1* | 6/2007 | Fu et al. ........................ 370/318 |
| 2007/0217366 A1* | 9/2007 | Sagi et al. ..................... 370/331 |
| 2007/0263574 A1 | 11/2007 | Lu et al. |
| 2008/0176548 A1* | 7/2008 | Liang ............................ 455/419 |
| 2009/0029697 A1* | 1/2009 | Bianconi et al. ........... 455/432.3 |
| 2009/0061932 A1 | 3/2009 | Nagarajan |
| 2009/0131054 A1 | 5/2009 | Zhang |
| 2010/0279698 A1* | 11/2010 | Wong ............................ 455/450 |
| 2011/0026450 A1* | 2/2011 | Kuchibhotla et al. ......... 370/312 |

FOREIGN PATENT DOCUMENTS

CN    101426295 A    5/2009

OTHER PUBLICATIONS

International Search Report and Written Opinion—PCT/US2011/047477—ISA/EPO—Dec. 1, 2011.

* cited by examiner

*Primary Examiner* — Michael Mapa
(74) *Attorney, Agent, or Firm* — Kristine U. Ekwueme (57) ABSTRACT

Certain aspects of the present disclosure relate to a method for hardware activation of dual USIM TD-SCDMA multimode mobile terminals. The technique effectively provides for efficient power consumption. In one aspect, a mobile terminal may register dual mobile identifiers on a first radio access technology (RAT) using a first hardware module. If a call is set up, the mobile terminal activates a second hardware module and registers the unused mobile identifier with the second RAT.

28 Claims, 10 Drawing Sheets

HARDWARE ACTIVATION OF DUAL USIM MULTIMODE MOBILE TERMINAL

CLAIM OF PRIORITY UNDER 35 U.S.C. §119

The present Application for Patent claims benefit of Provisional Application Ser. No. 61/372,776, filed Aug. 11, 2010, and assigned to the assignee hereof and hereby expressly incorporated by reference herein.

BACKGROUND

1. Field

Aspects of the present disclosure relate generally to wireless communication systems, and more particularly, to dual identity mobile terminals.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communications is provided. The method generally includes activating a first module for communicating with a first radio access technology (RAT), while a second module for communicating with a second RAT is de-activated. The method further includes registering at least first and second mobile identifiers with the first RAT using the first module, initiating a call with the first mobile identifier using the first module, activating the second module, and registering the second mobile identifier with the second RAT using the second module.

In an aspect of the disclosure, an apparatus for wireless communication is provided. The apparatus generally includes means for activating a first module for communicating with a first radio access technology (RAT), while a second module for communicating with a second RAT is de-activated; means for registering at least first and second mobile identifiers with the first RAT using the first module; means for initiating a call with the first mobile identifier using the first module; means for activating the second module; and means for registering the second mobile identifier with the second RAT using the second module.

In an aspect of the disclosure, a computer program product comprising a computer-readable medium is provided. The computer-readable medium generally comprises code for activating a first module for communicating with a first radio access technology (RAT), while a second module for communicating with a second RAT is de-activated; registering at least first and second mobile identifiers with the first RAT using the first module; initiating a call with the first mobile identifier using the first module; activating the second module; and registering the second mobile identifier with the second RAT using the second module.

In an aspect of the disclosure, an apparatus for wireless communication comprising at least one processor and a memory coupled to the at least one processor is provided. The at least one processor is generally configured to activate a first module for communicating with a first radio access technology (RAT), while a second module for communicating with a second RAT is de-activated; register at least first and second mobile identifiers with the first RAT using the first module; initiate a call with the first mobile identifier using the first module; activate the second module; and register the second mobile identifier with the second RAT using the second module.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
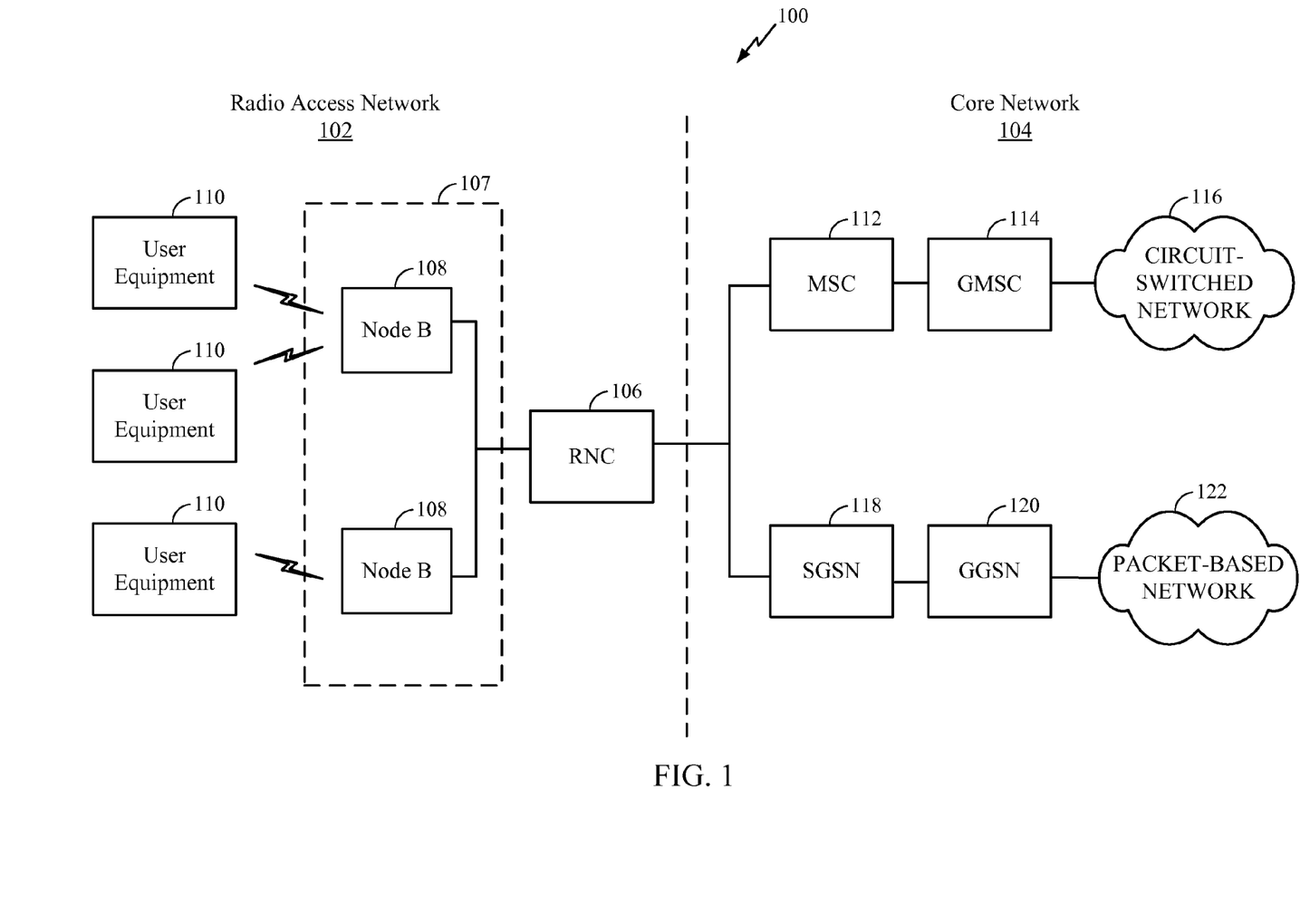
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
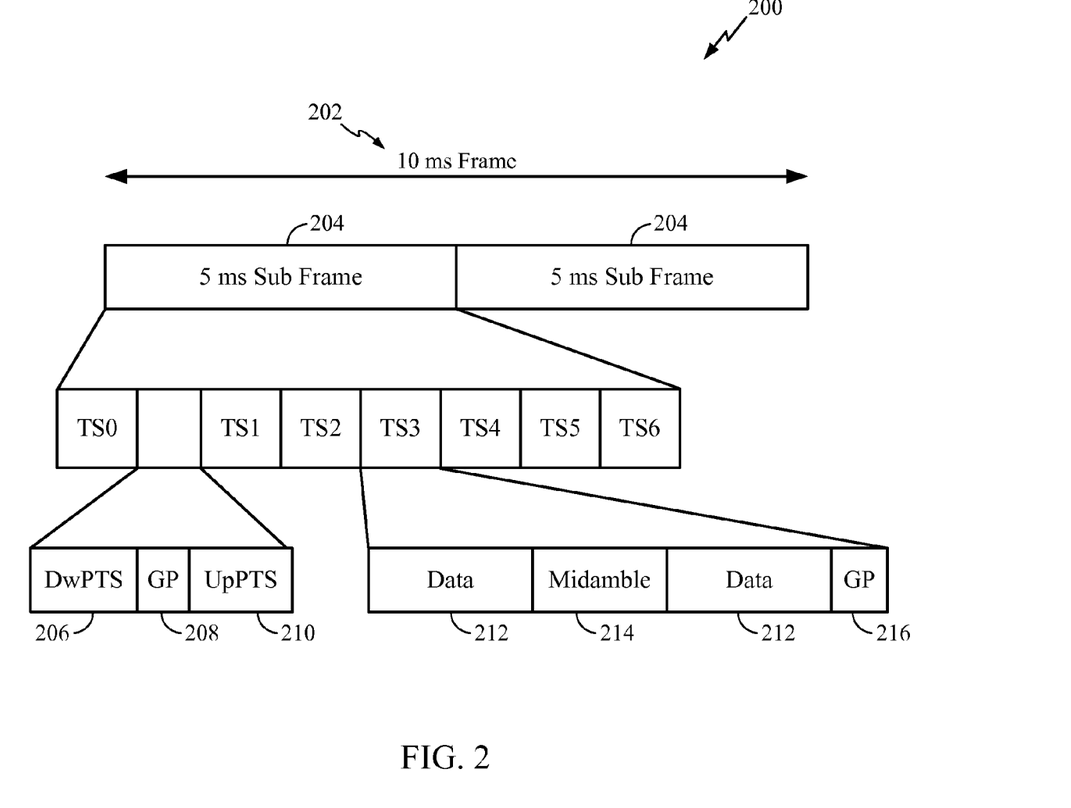
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. According to certain aspects, a UE may register multiple mobile identifiers (e.g., IMSIs), as described in greater detail below, within time slots allocated for uplink communications.

Figure 3:
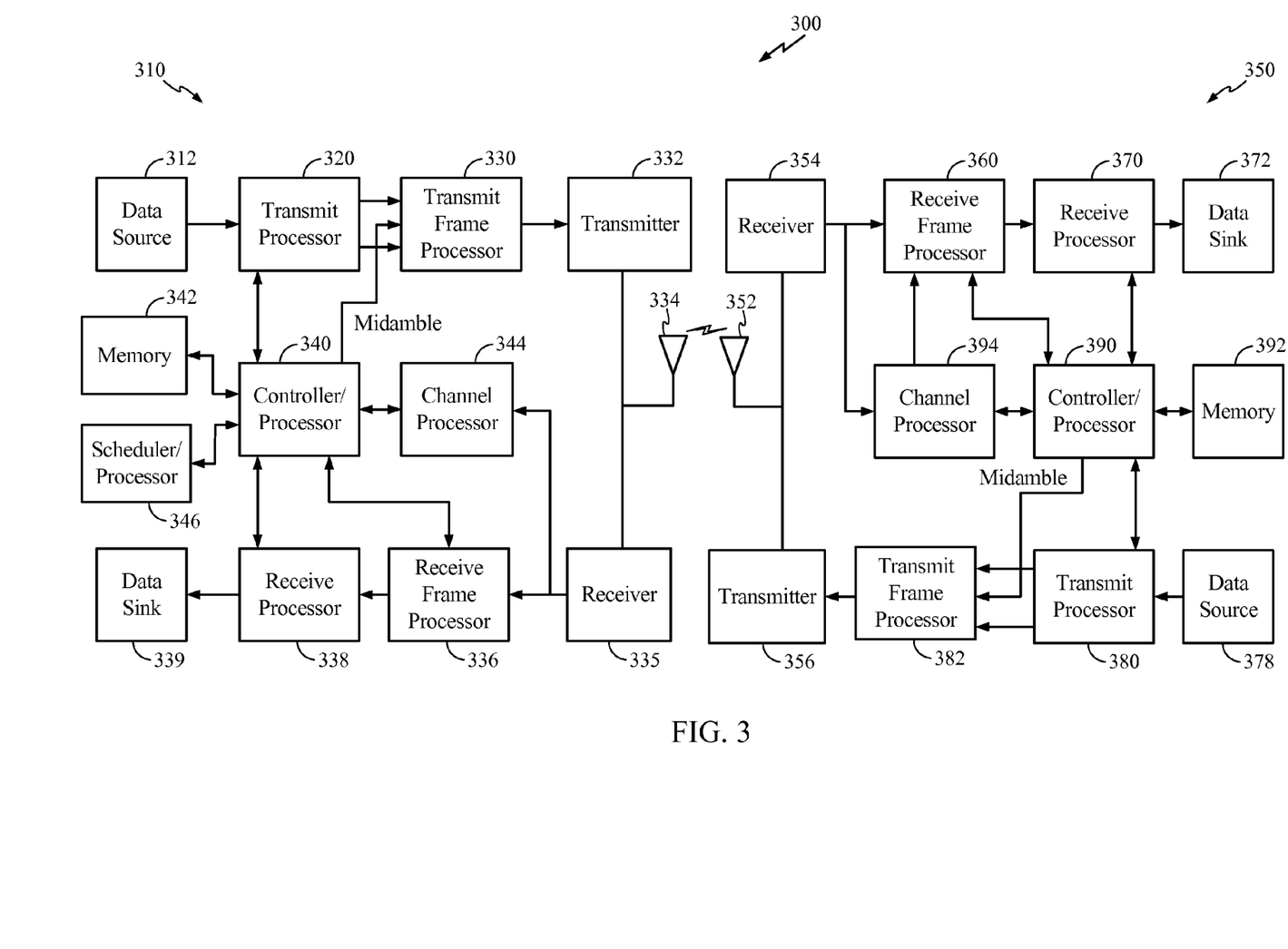
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

In one embodiment, the controller/processor 390 may activate a first module for communicating with a first radio access technology (RAT), while a second module for communicating with a second RAT is de-activated. The transmitter 355 may register at least first and second mobile identifiers with the first RAT using the first module. The transmitter 356 or receiver 354 may initiate a call with the first mobile identifier using the first module. The controller/processor 390 may further activate the second module. The transmitter 355 may further register the second mobile identifier with the second RAT using the second module.

Method of Hardware Activation of Dual USIM TD-SCDMA Multimode Mobile Terminal In some countries, for example, China, it is popular to have a mobile phone support more than one Universal Subscriber Identity Module (USIM), whereby a user may make a phone call using different phone numbers. Each USIM has a unique International Mobile Subscriber Identity (IMSI), which is used to identify a mobile phone user within a mobile network. In one aspect, an IMSI may be encoded in a smart card inserted into a mobile phone. Dual-USIM-supported mobile phones may also feature "dual standby" and "dual talk", where the mobile phone may be in any combination of idle and connected status (i.e. a call is made and in progress).

Figure 4:
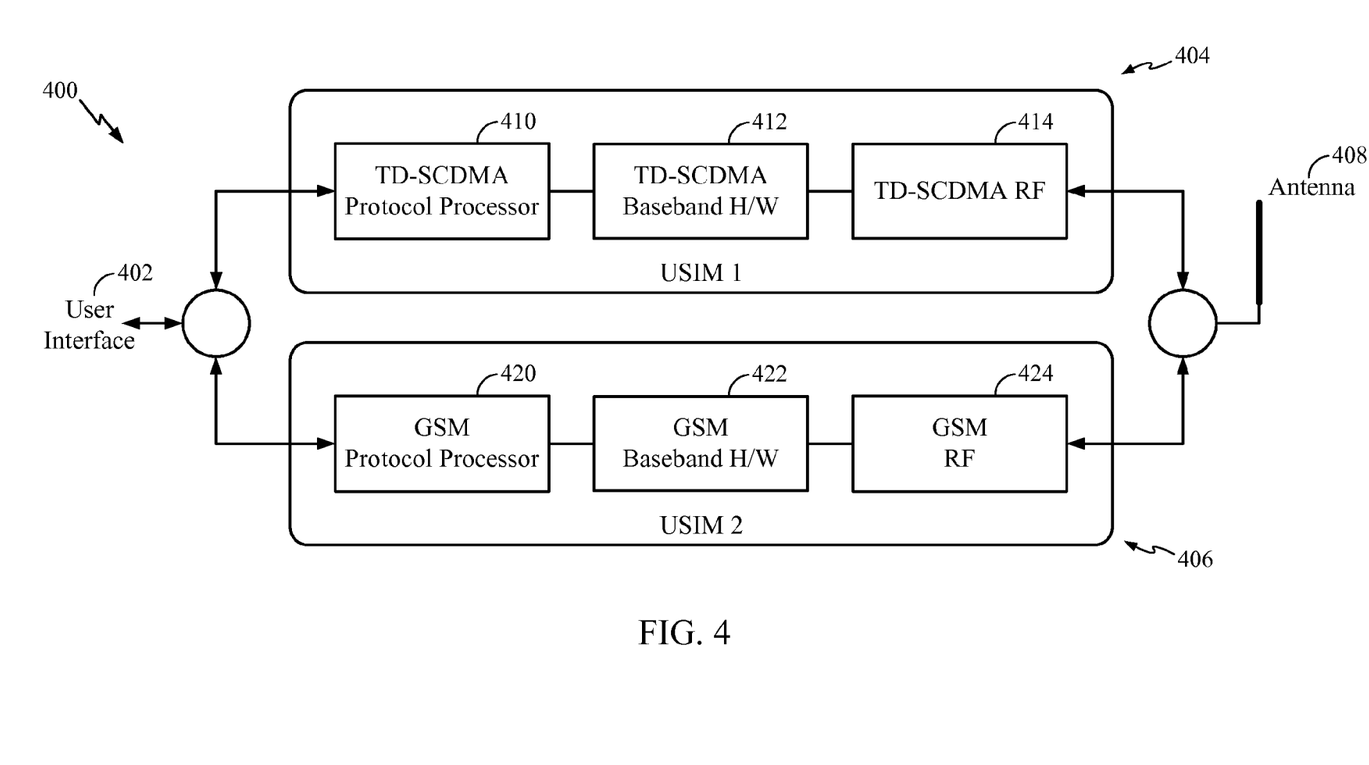
FIG. 4 is a block diagram conceptually illustrating an exemplary UE in accordance with aspects of the present disclosure.

FIG. 4 illustrates an exemplary hardware configuration that supports dual USIMs (USIM 1 and USIM 2). In one aspect, a UE 400 may include a user interface 402, a first hardware module 404, a second hardware module 406, and an antenna 408. Hardware modules 404 and 406 may include independent protocol processors 410 and 420, baseband hardware 412 and 422, and radio frequency (RF) hardware 414 and 424. The hardware modules 404 and 406 may each support a radio access technology (RAT). For example, hardware module 404 may support TD-SCDMA, and hardware module 406 may support GSM. In one aspect, each separate hardware module 404 and 406 may be dedicated to a single USIM (e.g., either USIM 1 or USIM 2).

In operation, dual GSM and TD-SCDMA hardware modules 404 and 406 may be activated simultaneously for the dual USIMs (USIM 1 and USIM 2). As a result, a user may have two phone numbers to register or make phone calls using these two modules 404 and 406 separately. However, an implementation of support for dual USIMs may have a high level of power consumption as both hardware modules 404 and 406 operate simultaneously. As such, a method for hardware activation of a dual USIM multimode mobile terminal that allows for power efficient dual standby and dual talk is provided.

According to one aspect of the present disclosure, a hardware configuration may be provided that enables USIMs to share any of the hardware modules. That is, each of the USIMs may use either hardware module to register and make a call flexibly.

Figure 5:
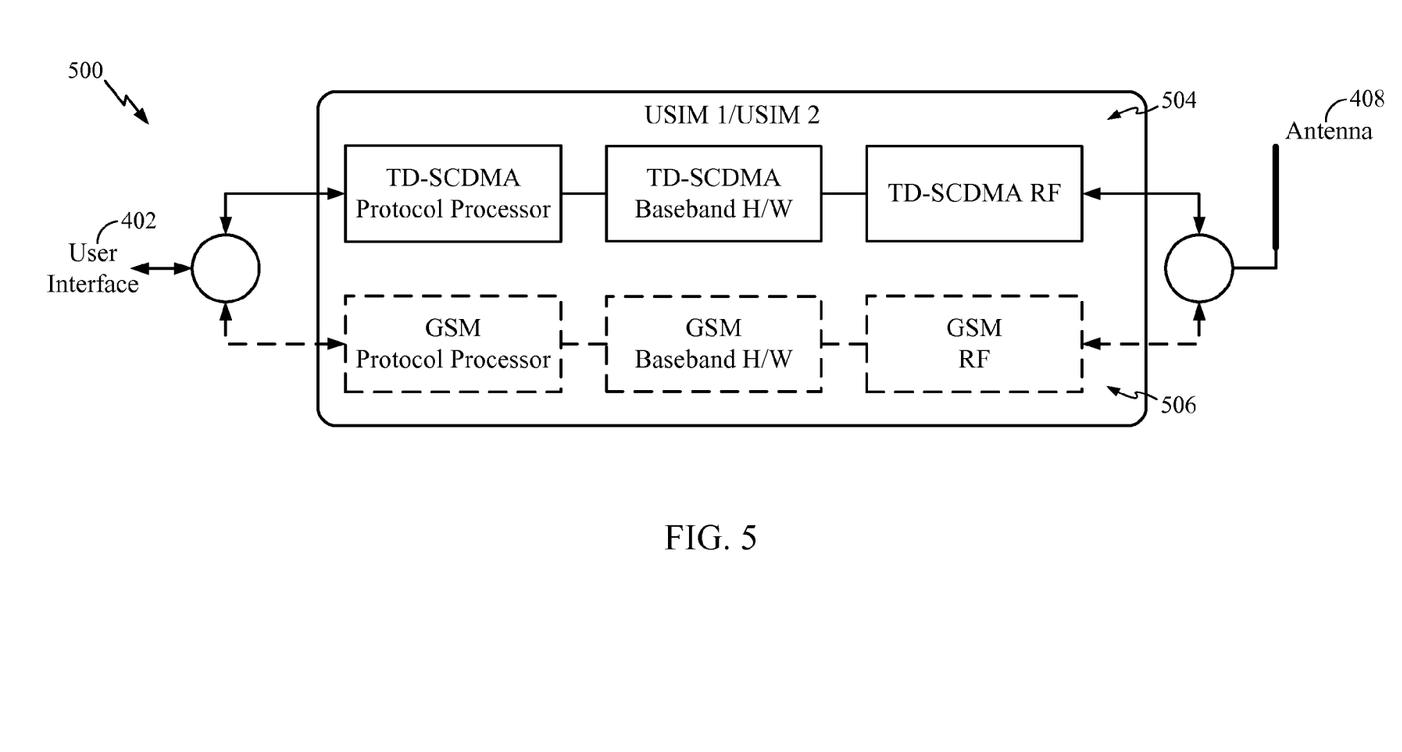
FIG. 5 is a block diagram conceptually illustrating an exemplary UE in accordance with aspects of the present disclosure.

FIG. 5 illustrates an exemplary hardware configuration that supports dual USIMs (USIM 1 and USIM 2) and allows the USIMs to share hardware modules 504 and 506. Similar to the hardware configuration of UE 400 described above, a UE 500 may include a user interface 402, a first hardware module 504, a second hardware module 506, and an antenna 408. In one example, the first hardware module 504 comprises a TD-SCDMA module having a TD-SCDMA protocol processor, TD-SCDMA baseband hardware, and TD-SCDMA RF hardware. The second hardware module 506 may comprise a GSM module having a GSM processor, GSM baseband hardware, and GSM RF hardware.

In one aspect, USIM 1 may use the first hardware module 504 or the second hardware module 506. Similarly, USIM 2 may also use the first hardware module 504 or the second hardware module 506. In one aspect, each USIM may be a subscriber of the same carrier. The dual hardware modules 504 and 506 may be treated as a multimode terminal from the perspective of the USIMs.

In FIG. 5, components of the second hardware module 506 are shown with dashed lining, to indicate these components may be inactived (e.g., powered off or otherwise disabled) as the second hardware module 506 is de-activated. These components may be activated, for example, after the UE 500 initiates a TD-SCDMA call, as will be described in further detail below with reference to FIGS. 6 and 7.

Figure 6:
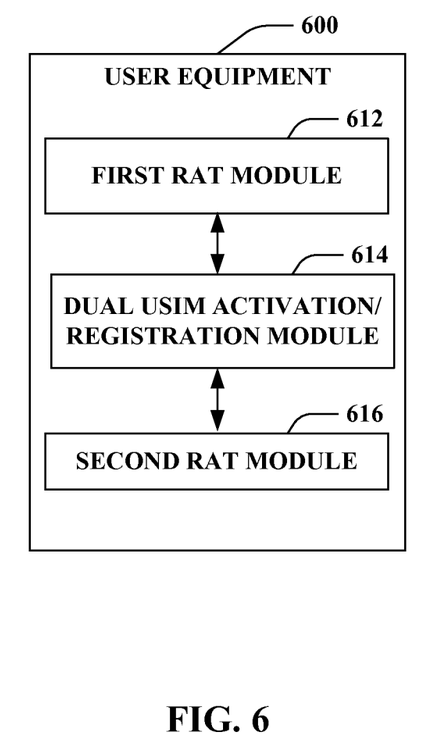
FIG. 6 is a block diagram conceptually illustrating an exemplary UE in accordance with aspects of the present disclosure.

FIG. 6 illustrates an example UE 600 with multiple SIs (USIMs or IMSIs) capable of performing the operation described herein. As illustrated, the UE 610 may include a first RAT module 612 (e.g., a TD-SCDMA module) and a second RAT module 616. As illustrated, the UE 610 may also include a module 614 capable of activating one or more of the first and second RAT modules in order to register the multiple SIs. According to certain aspects, the module 614 may be configured to perform operations described in further detail below, with reference to FIG. 7.

Figure 7:
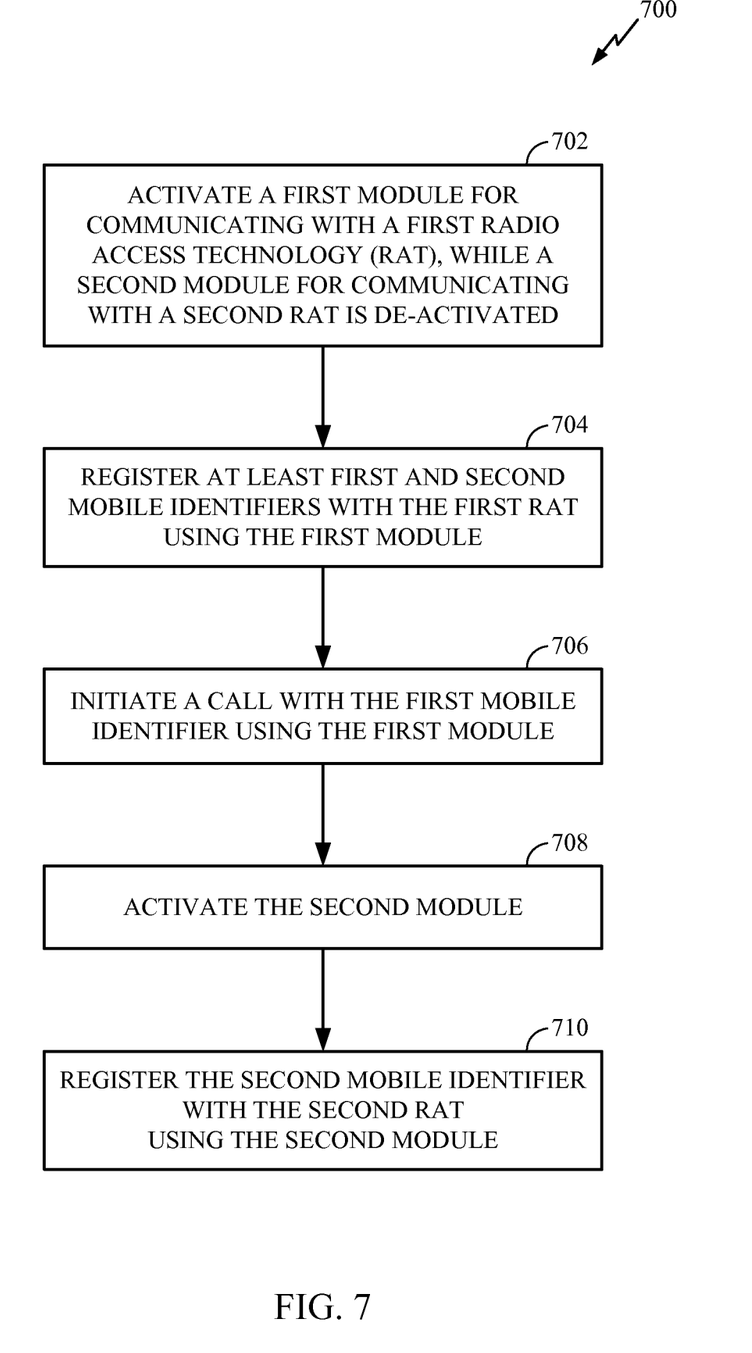
FIG. 7 is a functional block diagram conceptually illustrating example blocks executed to implement the functional characteristics of one aspect of the present disclosure.

FIG. 7 is a functional block diagram illustrating example operations 700 executed in conducting wireless communication according to one aspect of the present disclosure.

A multimode UE, such as the UE 500 illustrated in FIG. 5 or UE 600 illustrated in FIG. 6, may operate in an idle mode according to aspects of the present disclosure. In one aspect, turning to FIG. 7, at 702, the UE may activate a first module for communicating with a first radio access technology (RAT), while a second module for communicating with a second RAT is de-activated. The first and second RATs may be any suitable radio access technology, including but not limited to, GSM, W-CDMA, TD-CDMA, and TD-SCDMA. In one embodiment, the first and second modules may be hardware modules having a protocol processor, baseband hardware, and RF hardware. At 704, the UE may further register at least a first and second mobile identifiers with the first RAT using the first module. According to an aspect, the first and second mobile identifiers may include an international mobile subscriber identity (IMSI) or a temporary mobile subscriber identity (TMSI).IMSI or a TMSI. The UE may further monitor paging messages for both USIMs. In one example, the UE may turn on the TD-SCDMA module in idle mode to register for both IMSIs of the dual USIMs with a TD-SCDMA NodeB within the wireless network. In another example, the UE may turn on the GSM module in idle mode to register both IMSIs with a GSM BTS within the wireless network.

The multimode UE may further operate in a connected mode according to aspects of the present disclosure. In one aspect, at 706, the UE may further initiate a call with the first mobile identifier using the first module. In an aspect, when there is a first call originating from a UE locally and from the network (i.e. due to paging), the current activated module enters a connected mode.

At 708, the UE may activate the second module. At 710, the UE may register the second module identifier with the second RAT using the second module. In one aspect, as soon as the first call starts, the second module is activated and the second (or standby) IMSI registers with the second module. This may allow the second IMSI to receive paging and set up a call on the separate second module with no hardware conflicts. It is noted that one module may not serve the calls for both USIMs. For example, it may not be possible for the baseband hardware to process two sets of signals. Also, it may be difficult to coordinate a handover: the first call may remain at a source cell while the second call is already handed over to a target cell. In one aspect, prior to activating the second module, the UE may monitor for paging messages for both the first and second mobile identifiers using the first RAT module.

In one aspect, the UE may further initiate a call with the second mobile identifier using the second module. The UE may enter a connected mode and may conduct the phone call with the second mobile identifier. After all calls are complete, the UE may terminate the call with the second mobile identifier and further terminate the call with the first mobile identifier. After terminating the call(s), the UE may proceed by de-activating the second module. The UE may register the second mobile identifier with the first RAT using the first module. In one aspect, after both calls are released, both USIMs can register to use a first module of a first RAT to be in the standby state; the other one of the modules is de-activated. In one aspect, both USIMs may register to use a default module of a default RAT.

Figure 8A:
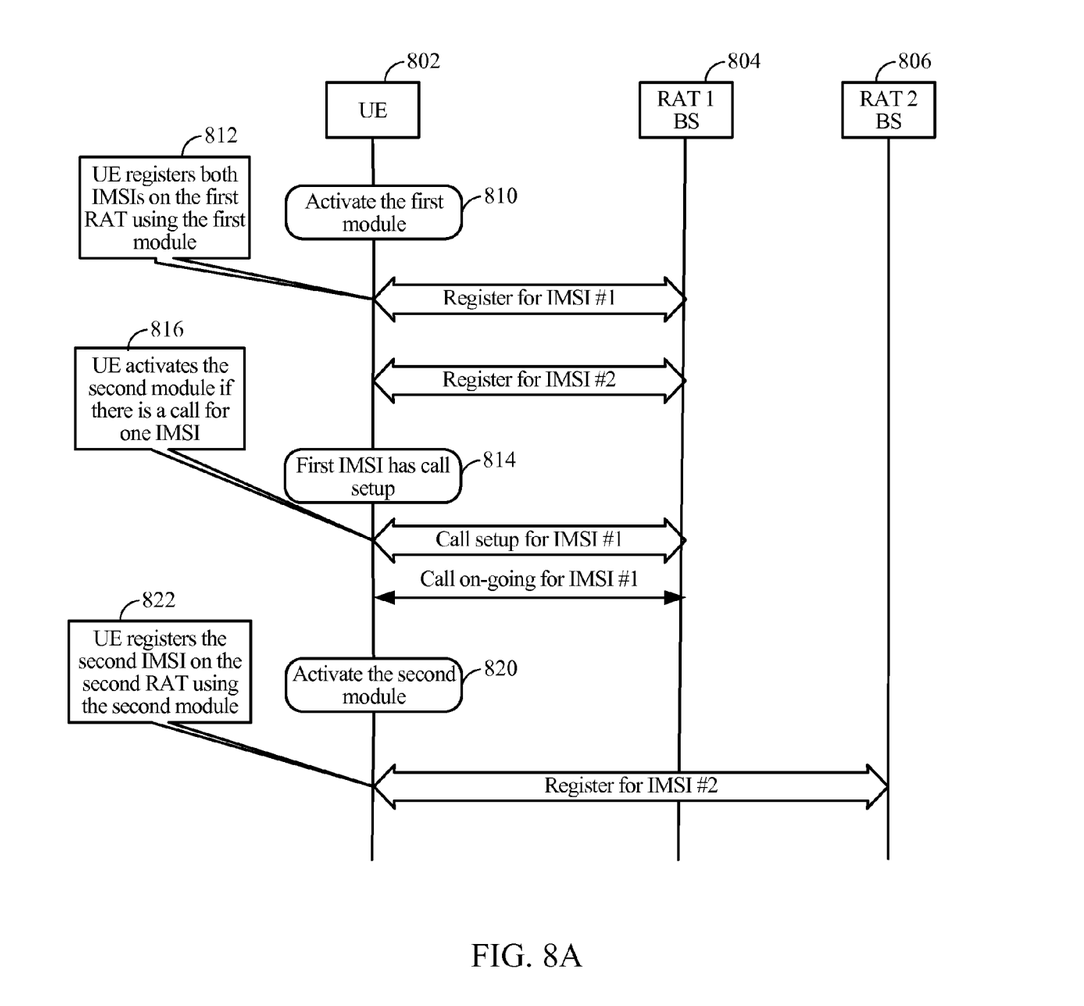
FIGS. 8A-8B are sequences diagram illustrating examples of a UE in communication with at least a base station in a telecommunications system.

FIG. 8A is a sequence diagram illustrating exemplary operations in accordance with the operations 700 shown in FIG. 7. In one aspect, a UE 802 may perform the exemplary operations with a base station (BS) 804 of a first RAT (RAT 1) (e.g, a TD-SCDMA Node B) and a BS of a second RAT 806 (e.g., a GSM BTS) in a wireless network. In one embodiment, the UE 802 supports at least two USIMs having a first IMSI and a second IMSI (denoted as "IMSI #1" and "IMSI #2", respectively). The UE 802, may be similar to the UE 500 described with reference to FIG. 5 or UE 600 described with reference to FIG. 6 and, thus, may include any corresponding RAT modules, such as a TD-SCDMA hardware module and a GSM hardware module.

At 810, the UE 802 may activate a first module. At 812, the UE 802 registers both IMSIs on the first RAT using the first module. In the example shown, the UE 802 registers IMSI #1 and IMSI #2 with a TD-SCDMA NB using a TD-SCDMA module. At 814, the UE 802 executes a call set up for IMSI #1. At 816, the UE 702 activates the second module if there is a call for one of the IMSIs. In the example shown, the UE 802 activates the second module at 820.

At 822, the UE 802 registers IMSI #2 on the second RAT using the second module. For example, the UE 802 may register IMSI #2 with a GSM BTS using GSM hardware module while the call is on-going with IMSI #1 (e.g., in TD-SCDMA).

Figure 8B:
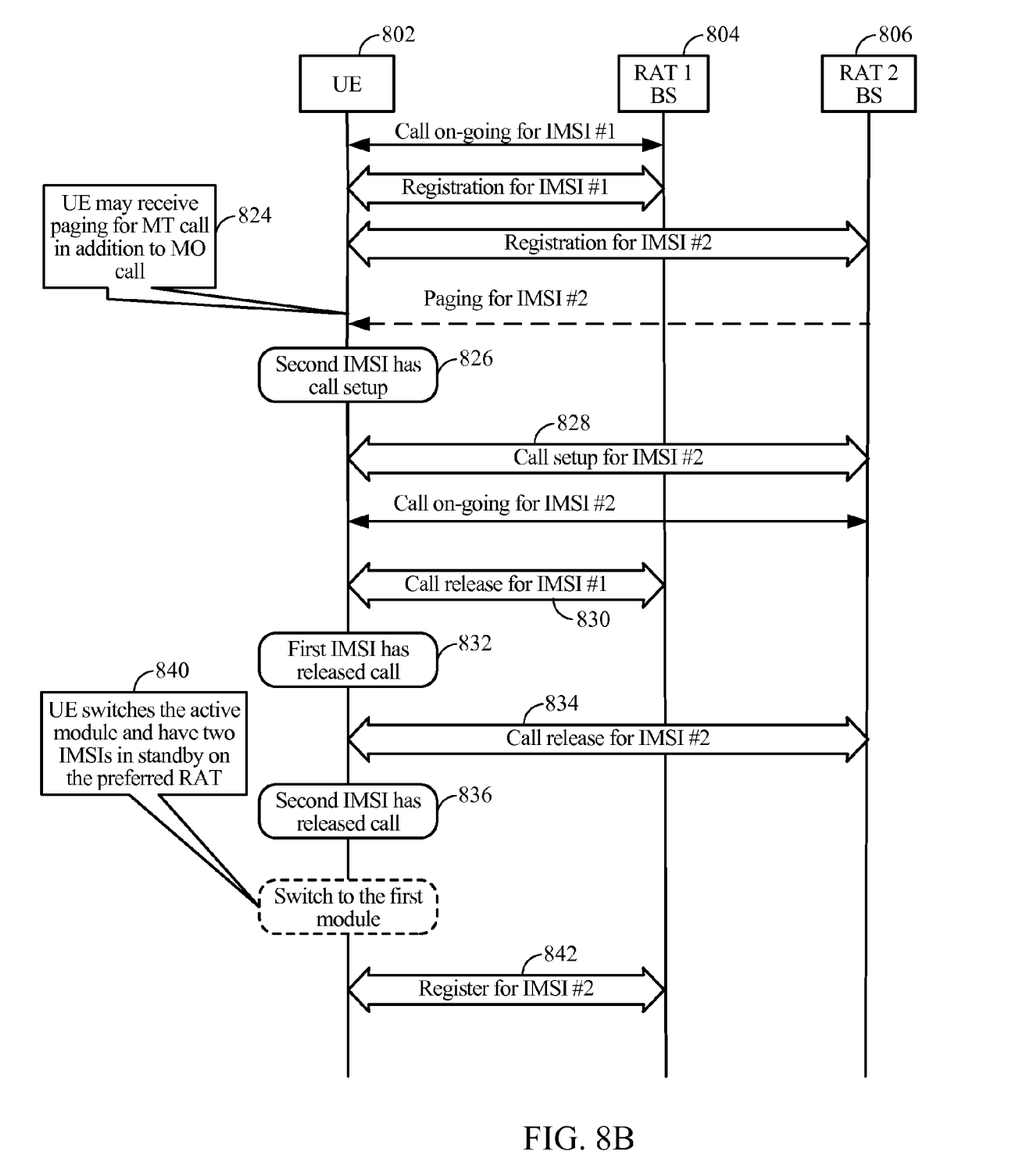

As illustrated in FIG. 8B, the UE may receive paging for a mobile-terminated (MT) call in addition to a mobile-originated (MO) call, at 824. In the example shown, the UE 802 receives paging for IMSI #2. At 826, IMSI #2 has a call setup. Thus, at 828, the UE is conducting an on-going call for IMSI #2 and an on-going call for IMSI #1 (i.e. dual talk).

At 830, the first call ends and the UE performs call release for IMSI #1 with the RAT 1 BS 804. At 832, the UE has terminated the call with IMSI #1. At 834, the UE performs call release with IMSI #2 with the RAT 2 BS 806. At 836, the UE has terminated the call with IMSI #2. At this point, both calls have ended. As such, according to one aspect, at 840, the UE switches to the first module (the "active" module) and has both IMSIs on standby on a single RAT. At 842, the UE may register the second mobile identifier with the first RAT. In the example shown, the UE may register IMSI #2 with the RAT 1 BS 804. In one aspect, the UE de-activates the second module. In the example shown, the UE 802 may de-activate the second RAT module.

Figure 9A:
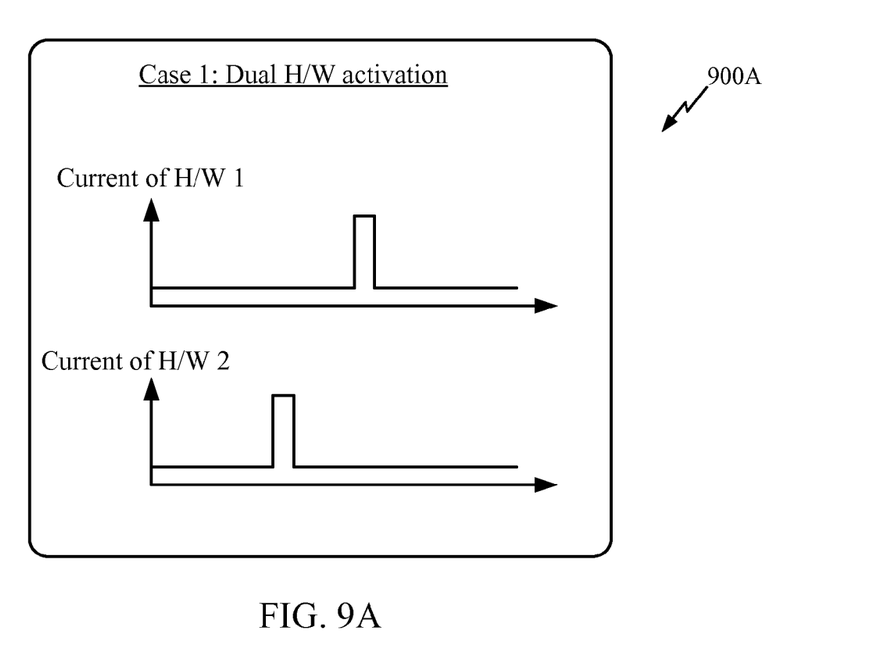
FIG. 9A-9B are graphs illustrating power consumption of an exemplary UE in accordance with aspects of the present disclosure.
Figure 9B:
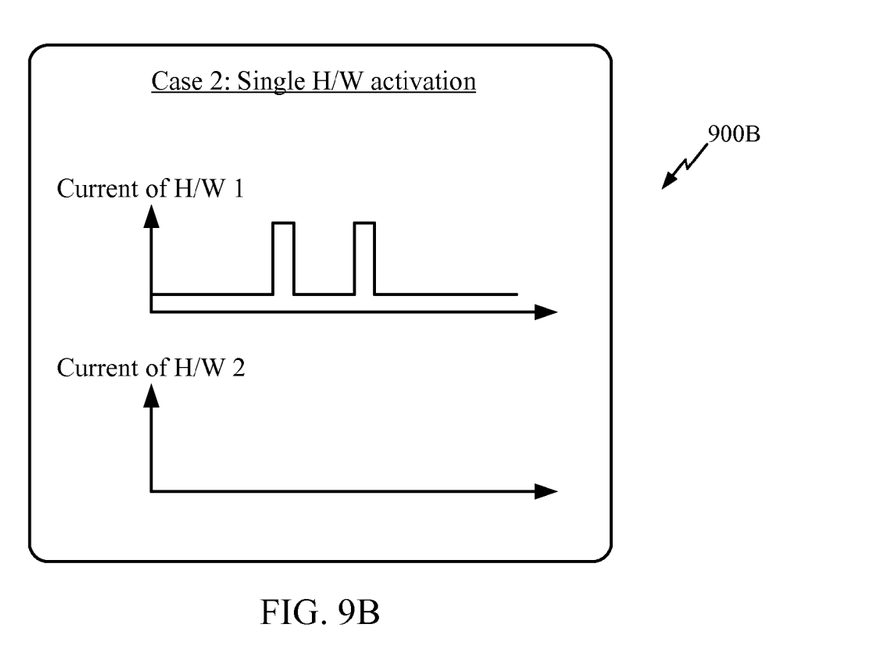

Thus, the provided technique allows a dual USIM multi-mode UE to remain in an idle state for dual IMSIs with efficient power usage and without any hardware conflicts for the active cells. FIG. 9A and 9B illustrate power consumption of hardware module within the UE using various techniques of activation. Consider the following scenario wherein approximately 1 mA is consumed in a sleep interval per hardware module, and approximately 50 mA is consumed in a paging monitoring interval per hardware module, and wherein a paging cycle is 1.28 seconds and paging wakeup interval is 20 ms. Graph 800A illustrates a Case #1 wherein two hardware modules of a UE ("H/W 1" and "H/W 2") are activated over a given duration of time. As illustrated, the current of hardware module 1 and hardware module 2 is always nonzero because the hardware modules must be used in a sleep interval or in a paging wakeup interval. In contrast, graph 800B illustrates a Case #2 wherein only a single hardware module of the two hardware modules on a UE is activated over a given duration of time. An electrical current used by H/W 2 is zero over the given duration of time. As such, the total power consumed by H/W 1 and H/W 2 in Case #2 is less than the total power consumed by the dual activation of hardware modules 1 and 2 as in Case #1. Accordingly, the activation of single hardware modules according to aspects of the disclosure may reduce power consumption.

In one configuration, the apparatus 350 for wireless communication includes means for activating a first module for communicating with a first radio access technology (RAT), while a second module for communicating with a second RAT is de-activated, means for registering at least first and second mobile identifiers with the first RAT using the first module, means for initiating a call with the first mobile identifier using the first module, means for activating the second module, and registering the second mobile identifier with the second RAT using the second module. In one aspect, the aforementioned means may be the processor(s) 390 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications, comprising:
   activating a first module for communicating with a first radio access technology (RAT), while a second module for communicating with a second RAT is de-activated;
   registering at least a first mobile identifier of a first subscriber identity module (SIM) and second mobile identifier of a second SIM with the first RAT using the first module when a user equipment (UE) is in an idle mode;
   initiating a call with the first mobile identifier using the first module such that the UE transitions from the idle mode to a connected mode;
   activating the second module in response to the call initiation; and
   registering the second mobile identifier with the second RAT using the second module while maintaining the call with the first mobile identifier using the first module.

2. The method of claim 1, further comprising:
   prior to activating the second module, monitoring for paging messages for both the first and second mobile identifiers using the first RAT module.

3. The method of claim 1, further comprising:
   initiating a call with the second mobile identifier using the second module.

4. The method of claim 3, further comprising:
   terminating the call with the second mobile identifier;
   terminating the call with first mobile identifier;
   de-activating the second module; and
   registering the second mobile identifier with the first RAT using the first module.

5. The method of claim 1, wherein the first and second mobile identifiers comprise at least one of an international mobile subscriber identity (IMSI) or a temporary mobile subscriber identity (TMSI).

6. The method of claim 1, wherein the first and second RAT comprise at least one of Global System for Mobile Communications (GSM), Wideband-Code Division Multiple Access (W-CDMA), Time Division-Code Division Multiple Access (TD-CDMA), and Time Division-Synchronous Code Division Multiple Access (TD-SCDMA).

7. The method of claim 1, wherein the first and second modules comprise a hardware module comprising a protocol processor, baseband hardware, and radio frequency (RF) hardware.

8. An apparatus for wireless communication, comprising:
   means for activating a first module for communicating with a first radio access technology (RAT), while a second module for communicating with a second RAT is de-activated;
   means for registering at least a first mobile identifier of a first subscriber identity module (SIM) and second mobile identifier of a second SIM with the first RAT using the first module when a user equipment (UE) is in an idle mode;
   means for initiating a call with the first mobile identifier using the first module such that the UE transitions from the idle mode to a connected mode;
   means for activating the second module in response to the call initiation; and
   means for registering the second mobile identifier with the second RAT using the second module while maintaining the call with the first mobile identifier using the first module.

9. The apparatus of claim 8, further comprising:
   means for, prior to activating the second module, monitoring for paging messages for both the first and second mobile identifiers using the first RAT module.

10. The apparatus of claim 8, further comprising:
means for initiating a call with the second mobile identifier using the second module.

11. The apparatus of claim 10, further comprising:
means for terminating the call with the second mobile identifier;
means for terminating the call with first mobile identifier;
means for de-activating the second module; and
means for registering the second mobile identifier with the first RAT using the first module.

12. The apparatus of claim 8, wherein the first and second mobile identifiers comprise at least one of an international mobile subscriber identity (IMSI) or a temporary mobile subscriber identity (TMSI).

13. The apparatus of claim 8, wherein the first and second RAT comprise at least one of Global System for Mobile Communications (GSM), Wideband-Code Division Multiple Access (W-CDMA), Time Division-Code Division Multiple Access (TD-CDMA), and Time Division-Synchronous Code Division Multiple Access (TD-SCDMA).

14. The apparatus of claim 8, wherein the first and second modules comprise a hardware module comprising a protocol processor, baseband hardware, and radio frequency (RF) hardware.

15. A computer program product, comprising:
a non-transitory computer-readable medium comprising code for:
activating a first module for communicating with a first radio access technology (RAT), while a second module for communicating with a second RAT is de-activated;
registering at least a first mobile identifier of a first subscriber identity module (SIM) and second mobile identifier of a second SIM with the first RAT using the first module when a user equipment (UE) is in an idle mode;
initiating a call with the first mobile identifier using the first module such that the UE transitions from the idle mode to a connected mode;
activating the second module in response to the call initiation; and
registering the second mobile identifier with the second RAT using the second module while maintaining the call with the first mobile identifier using the first module.

16. The computer program product of claim 15, further comprising code for:
prior to activating the second module, monitoring for paging messages for both the first and second mobile identifiers using the first RAT module.

17. The computer program product of claim 15, further comprising code for:
initiating a call with the second mobile identifier using the second module.

18. The computer program product of claim 17, further comprising code for:
terminating the call with the second mobile identifier;
terminating the call with first mobile identifier;
de-activating the second module; and
registering the second mobile identifier with the first RAT using the first module.

19. The computer program product of claim 15, wherein the first and second mobile identifiers comprise at least one of an international mobile subscriber identity (IMSI) or a temporary mobile subscriber identity (TMSI).

20. The computer program product of claim 15, wherein the first and second RAT comprise at least one of Global System for Mobile Communications (GSM), Wideband-Code Division Multiple Access (W-CDMA), Time Division-Code Division Multiple Access (TD-CDMA), and Time Division-Synchronous Code Division Multiple Access (TD-SCDMA).

21. The computer program product of claim 15, wherein the first and second modules comprise a hardware module comprising a protocol processor, baseband hardware, and radio frequency (RF) hardware.

22. An apparatus for wireless communication, comprising:
at least one processor; and
a memory coupled to the at least one processor, wherein the at least one processor is configured to:
activate a first module for communicating with a first radio access technology (RAT), while a second module for communicating with a second RAT is de-activated;
register at least a first mobile identifier of a first subscriber identity module (SIM) and second mobile identifier of a second SIM with the first RAT using the first module when a user equipment (UE) is in an idle mode;
initiate a call with the first mobile identifier using the first module such that the UE transitions from the idle mode to a connected mode;
activate the second module in response to the call initiation; and
register the second mobile identifier with the second RAT using the second module while maintaining the call with the first mobile identifier using the first module.

23. The apparatus of claim 22, wherein the at least one processor is further configured to: prior to activating the second module, monitor for paging messages for both the first and second mobile identifiers using the first RAT module.

24. The apparatus of claim 22, wherein the at least one processor is further configured to: initiate a call with the second mobile identifier using the second module.

25. The apparatus of claim 24, wherein the at least one processor is further configured to: terminate the call with the second mobile identifier; terminate the call with first mobile identifier; de-activate the second module; and register the second mobile identifier with the first RAT using the first module.

26. The apparatus of claim 22, wherein the first and second mobile identifiers comprise at least one of an international mobile subscriber identity (IMSI) or a temporary mobile subscriber identity (TMSI).

27. The apparatus of claim 22, wherein the first and second RAT comprise at least one of Global System for Mobile Communications (GSM), Wideband-Code Division Multiple Access (W-CDMA), Time Division-Code Division Multiple Access (TD-CDMA), and Time Division-Synchronous Code Division Multiple Access (TD-SCDMA).

28. The apparatus of claim 22, wherein the first and second modules comprise a hardware module comprising a protocol processor, baseband hardware, and radio frequency (RF) hardware.

* * * * *